United States Patent [19]

Andres et al.

[11] Patent Number: 4,622,548

[45] Date of Patent: Nov. 11, 1986

[54] SOLID STATE ELECTRONIC G-FORCE INDICATOR

[75] Inventors: James R. Andres, Vandalia, Ohio; Donald D. Wilson, Norman, Okla.

[73] Assignee: The United States of America as represented by the Secretary of the Air Force, Washington, D.C.

[21] Appl. No.: 693,926

[22] Filed: Jan. 23, 1985

[51] Int. Cl.⁴ .............................................. G01P 1/07
[52] U.S. Cl. ..................................... 340/753; 73/492; 73/493; 73/499; 340/971
[58] Field of Search ............. 73/491, 492, 499, 517 R, 73/1 D, 493; 340/753, 754, 971, 973, 718, 719; 364/566

[56] References Cited

U.S. PATENT DOCUMENTS

| | | | |
|---|---|---|---|
| 2,394,978 | 2/1946 | Bevins | 73/492 |
| 2,942,864 | 6/1960 | Sikora | 73/493 |
| 3,049,685 | 8/1962 | Wright, Jr. | 338/2 |
| 3,284,708 | 11/1966 | Morris et al. | 324/70 |
| 3,726,250 | 4/1973 | Merk | 340/754 |
| 3,798,454 | 3/1974 | Weiss | 250/231 |
| 3,867,844 | 2/1975 | Shimizu | 73/517 R |
| 4,023,396 | 5/1977 | Yakshin et al. | 364/566 |
| 4,114,453 | 9/1978 | Sandler | 73/517 R |
| 4,210,908 | 7/1980 | Sakakibara | 340/754 |
| 4,242,910 | 1/1981 | Stoltz | 73/516 LM |
| 4,430,895 | 2/1984 | Colton | 73/497 |
| 4,463,355 | 7/1984 | Schultz et al. | 340/754 |

OTHER PUBLICATIONS

"Bar Graph Uses Liquid Crystal", *Electronics*, vol. 49, No. 10, May 13, 1976, pp. 31-34.

*Primary Examiner*—Stewart J. Levy
*Assistant Examiner*—John E. Chapman, Jr.
*Attorney, Agent, or Firm*—Gerald B. Hollins; Donald J. Singer

[57] ABSTRACT

A G-force acceleration measuring instrument for use in an aircraft, spacecraft, submarine, or other vehicle, and employing electronic sensing and display transducers for increased reliability, small size, and small mass. The instrument includes a bar graph display, preferably incorporating liquid crystal transducer elements, uses a solid state or limited motion acceleration transducer, and provides graphic and numeric indication of the present G-force value together with numeric indication of historic maximum and minimum G-force values. The instrument also includes gain adjustment arrangements for accommodating different instrument panel slopes mounting in different types of vehicles with different G force capability, and a signal output tap for recording or slave indicating or telemetry or feedback use.

27 Claims, 6 Drawing Figures

SOLID STATE ELECTRONIC G-FORCE INDICATOR

RIGHTS OF THE GOVERNMENT

The invention described herein may be manufactured and used by or for the Government of the United States for all governmental purposes without the payment of any royalty.

BACKGROUND OF THE INVENTION

This invention relates to the field of instrumentation used in controlling and monitoring the movement of a fluid-supported vehicle such as an aircraft, a spacecraft or a submarine, and further concerns the sensing of acceleration of G-forces acting on such a vehicle and the conveyance of magnitude information concerning the sensed forces to a human operator.

For controlling the trajectory of a fluid-supported moving vehicle such as an aircraft, it is frequently desirable to sense and convey to an operator, measurements of the G-forces acting on the vehicle and tending to change its direction of movement. In the case of a moving aircraft, for example, it is especially desirable to know with some degree of precision the magnitude of the acceleration forces tending to increase or decrease the altitude of the aircraft. A record of the incurred acceleration forces for an airframe is also important to prevent continued overstressing of the airframe during combat or aerobatic maneuvers. Preferably such sensing and recording is achieved using the most basic and reliable measurement sensors possible in order to reliably supplement the human operator's sensors—sensors which are easily and intermittently deceived by vertigo and other motion-related considerations. In the case of nuclear submarines, the sensing and display of G forces is also desirable for controlling vessel movement.

In aircraft flight instruments, G-force accelerations along the Z axis, that is, along the spinal column of the pilot or in the directions tending to move the aircraft up or down in a flight path, are of primary interest although sensitivity to forces acting along other axes can be important and can readily be provided by the apparatus of the present invention. A combination of quick readability and accuracy are also desirable in a vehicle-mounted instrument in addition to the normal needs of low mass, small size, wide temperature tolerance and vibration immunity.

Mechanical linkage devices based upon the position changes of a spring-loaded mass in response to applied acceleration forces have been used as airborne sensors and indicators of acceleration forces since the early days of human flight. These mechanically-operated devices are, however, found to be prone to mechanical failures and inaccuracies from vibration, friction, jamming, and mechanical wear to a degree that is undesirable in aircraft equipment.

The increased functional capability, reduced physical size and weight of currently produced electronic devices suggest the incorporation of such devices in G-force sensing instrumentation. As is discussed in more detail below, such electronic sensing equipment is also compatible with the frequent need to remotely monitor or use or record signals relating to the movement of a vehicle.

The development of the integrated electronic circuit, the dichroric liquid crystal display and electrical transducers capable of responding to physical strain or physical movement with a change of electrical properties such as resistance or electrical voltage, have therefore combined to allow significant improvement of the G-force instrumentation used in presently designed vehicles. In particular, these developments have enabled the performance of acceleration sensing and display without the use of components which are subject to complex mechanical movements; such instruments can thereby be largely immune to the debilitating effects of wear, friction and vibration, which were problems in the older mechanical instruments.

The patent art includes several examples of devices which relate to one or more portions of a G-force instrument. This art includes the patent of David E. Weiss, U.S. Pat. No. 3,798,454, which concerns an accelerometer employing a movable inertia weight that is suspended on cantilever springs. The weight and springs are linearly arranged opposite a light source to communicate light between its source and one of several light sensing elements disposed to indicate varying degrees of sensed acceleration. The Weiss apparatus contemplates use of the acceleration sensor for measurement, recording and classification of accelerations for subsequent evaluation, as might be done for vehicle maintenance or safety considerations. The Weiss apparatus also employs a series of counters which record the number of acceleration events exceeding predetermined threshold levels.

Another patent which concerns the acceleration sensing art is issued to Benzion Sandler, U.S. Pat. No. 4,114,453, and concerns several arrangements usable in fabricating an acceleration sensing transducer of the variable electrical resistance type.

Another electrical transducer device is shown in the U.S. Patent of William V. Wright, Jr., U.S. Pat. No. 3,049,685; the Wright transducer is of the general purpose strain measuring type such as might be employed for motion sensing, accelerometers, and other instruments. The Wright strain gauge transducer is of the PN junction type and is configured into the four-leg bridge circuit frequently employed in electrical measurement work.

Another acceleration-responsive apparatus is shown in the patent of H. D. Morris et al, U.S. Pat. No. 3,284,708, wherein is described a dual-range integrating accelerometer that incorporates a digital memory circuit. The Morris apparatus is contemplated for use in moving vehicles such as rocket-propelled spacecraft. The Morris apparatus contemplates integration of an accelerometer signal derived from the electrical output of a position nulling servo-system. The Morris apparatus also contemplates the processing and communication of acceleration data by telemetry without use of a vehicle mounted display.

Another patent which shows the combination of visual display elements, human operator, and G-force acceleration is in the name of Daniel W. Repperger et al, Ser. No. 06/645,390, filed 8/29/84. In the Repperger et al patent there is shown a display arrangement wherein light emitting diodes or other visual stimulus elements are located around the periphery of a human test subject while the subject is exposed to G-force acceleration in the gondola of a test centrifuge. Random light patterns displayed by a first group of visual stimulus elements in this Repperger peripheral display are to be matched or duplicated in a second adjacent group of stimulus elements which are under the control of the test subject. The Repperger apparatus is thereby sensitive to the loss of peripheral field vision on the part of a test subject; this loss is, of course, a result of decreased blood pressure caused by the centrifuge G-force acceleration. The Repperger patent also describes a U.S. Navy originated display used for similar centrifugal testing with somewhat less complexity and accuracy than is achieved in the Repperger apparatus; this Navy apparatus is shown in U.S. Pat. No. 4,421,393, issued to Malcolm Cohen. Neither the Repperger or Cohen patents involve the displaying of G-force magnitudes, however.

The patent art also includes a variety of electrical signal generating transducer elements responsive to acceleration forces according to a plurality of response mechanisms. Typical among these acceleration sensing transducers are the devices described in the patents of Harold D. Morris, U.S. Pat. No. 3,074,279; Eugene C. Huebschmann, U.S. Pat. No. 3,074,280; Tetsuji Shimizu et al, U.S. Pat. No. 3,867,844; Albert P. Youmans, U.S. Pat. No. 4,050,049; Mark L. Stephens et al, U.S. Pat. No. 4,166,269; Andries J. Stoltz, U.S. Pat. No. 4,242,910; and Russell F. Colton, U.S. Pat. No. 4,430,895. Several of these differing accelerometer transducers could be used in the apparatus of the present invention and the disclosure of these transducer patents is therefore hereby incorporated by reference into the present document.

SUMMARY OF THE INVENTION

An object of the present invention is to provide a G-force acceleration sensing instrument which operates without the presence of moving parts or with limited simple movement of a single part.

Another object of the invention is to provide an acceleration sensing and indicating instrument of small physical size and mass.

Another object of the invention is to provide an acceleration indicating instrument which provides both graphic and numeric indications of sensed acceleration.

Another object of the invention is to provide a single acceleration sensing and indicating instrument which is suitable for use in a variety of different vehicles having differing instrument mounting angles with respect to a vertical reference.

Another object of the invention is to provide a single acceleration instrument capable of operating in different vehicles with a plurality of different acceleration value ranges and capable of being configured into these different operating ranges by a jumper pin arrangement in the instrument electrical connector.

Another object of the invention is to provide a standard accelerometer instrument which is capable of being altered in sensitivity and display scales for use in fighter/attack and bomber/cargo aircraft where scale ranges such as +10 G/−5 G and +5 G −2.5 G are appropriate and yet use of the same index divisions is desirable.

Another object of the invention is to provide an acceleration indicating instrument capable of providing an analog or digital electrical signal output.

Another object of the invention is to provide an accelerometer having an electrical output signal either analog or digital that can be used in testing of the accelerometer and for acceleration value recording or other uses during instrument operation.

Another object of the invention is to proivde an acceleration sensing and indicating instrument capable of remembering a plurality of previously achieved acceleration values.

Another object of the invention is to provide an acceleration sensing and indicating instrument capable of assisting in keeping airframe G loads within the limits to which the airframe was designed.

Another object of the invention is to provide an acceleration sensing and indicating instrument capable of remembering the maximum positive and maximum negative acceleration forces incurred since the last instrument resetting event.

Another object of the invention is to provide an acceleration indicating instrument which incorporates the advantages of a liquid crystal display.

Additional objects and features of the invention will be understood from the following description and the accompanying drawings.

These objects and features are achieved by providing an electronic G-force sensing and indicating instrument which inlcudes a transducer for generating an analog electrical signal responsive to the magnitude of sensed G-force accelerations, electronic circuit means for converting the analog electrical signal to a plurality of sequentially coded binary signals representing successive increments of G-force amplitude at successive code values, each increment of increased G force changing an additional one of the binary signals to the active signal condition, and electrically-controlled display means for converting the coded binary signals to visual stimuli, the display means including a plurality of binary signal actuated display elements located in an ordered physical array with each display element connected with one of the plurality of binary signals.

DETAILED DESCRIPTION

Figure 1:
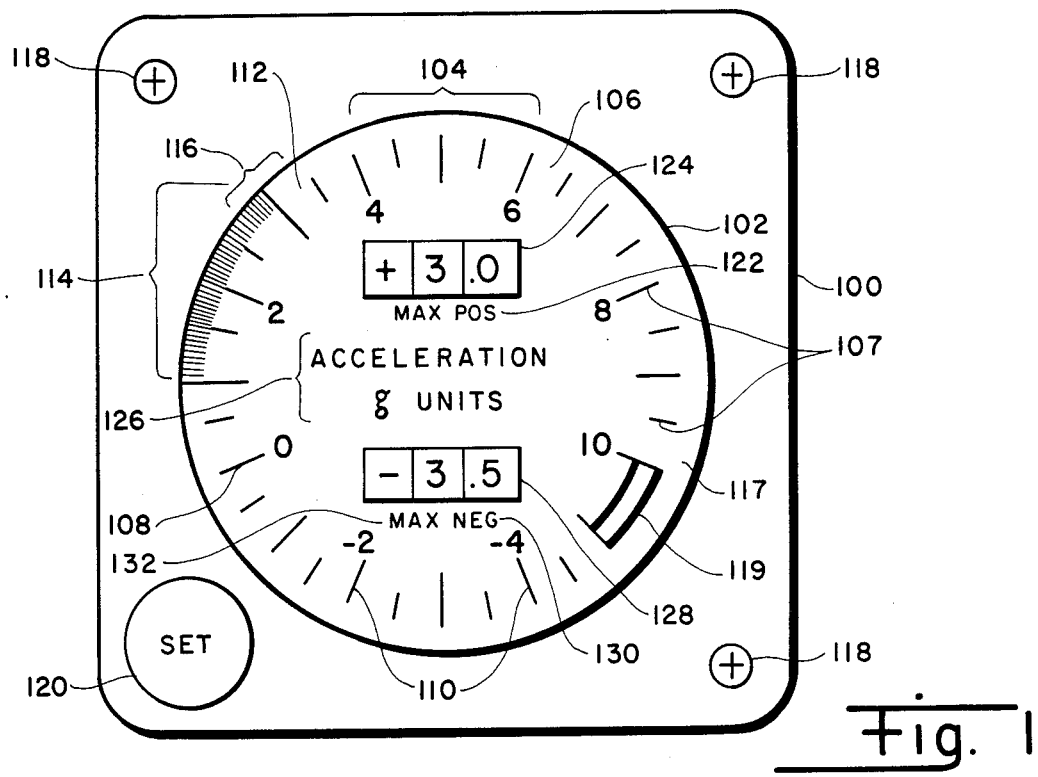
FIG. 1 is the display portion of an acceleration indicating instrument made according to the invention.

The display face of an acceleration sensing and indicating instrument suitable for use in vehicles such as a modern aircraft is shown in FIG. 1 of the drawings. The FIG. 1 instrument includes a bezel 100, in which is located a circular opening 102, a plurality of mounting fasteners 118, and a control or setting knob 120. Located within the opening 102 is an annular shaped bar graph display area 112, a display face 106, and a pair of digital readout fields 124 and 128.

The display face 106 also includes a numeric value scale 104 for the annular display area 112, with the numeric values shown including a sequence of positive numbers 107, and a sequence of negative numbers 110; the positive and negative sequences meet at the zero value 108 and the end of range mark 119. The display face 106 also includes a display identifying legend 126 and a pair of data-identifying fields 122 and 130 which are associated with the digital readout fields 124 and 128.

The annular shaped display area 112 incorporates an array of electrical-to-optical transducer elements of the type indicated generically at 116, the transducer elements as indicated at 117 being presumed in the inactive or non-visible state, while the transducer elements at 114 are presumed in the active and visible state. Each of these transducer elements is individually controlled by a separate electronic driver circuit or by the decoding of data appearing on a lesser number of transmission lines than the number of transducer elements, or by a time multiplexing arrangement, all of which arrangements are known in the art. Additional details of one arrangement for driving the transducer elements are described below.

The transducer elements 116 may be of the light emitting diode type, the incandenscent filament type, or the dichroric liquid crystal cell type, the latter in combination with a source of instrument illumination being preferred.

According to an additional preferred arrangement of the invention, the value of G-force acceleration displayed by the active or visible state transducer elements 114 is also shown in numeric form in the digital readout field 124, the combination of graphic and numeric display being desirable for both quick operator reference purposes and for accurate measurements under varying conditions of instrument use. A graphic display, using the visible state transducer elements 114, is particularly desirable for use in an aircraft under maneuvering conditions which subject the pilot and the airframe to G forces which may tend to render unconsciousness (black out) or approach the point of damage to the airframe.

Figure 2:
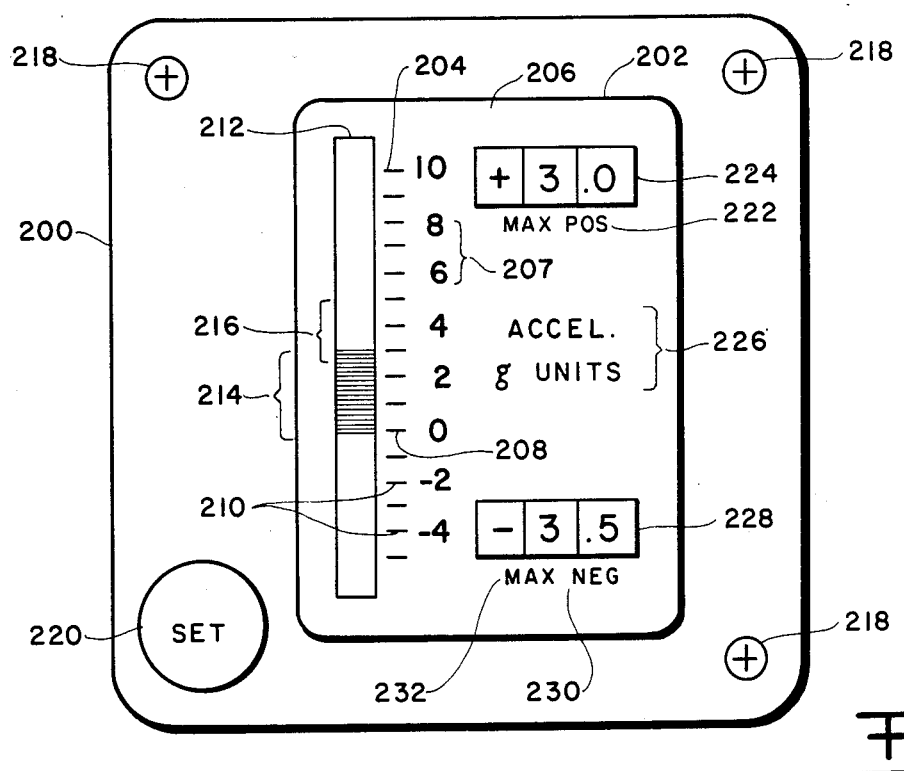
FIG. 2 is an alternate arrangement of the FIG. 1 acceleration indicating instrument display.
Figure 4:
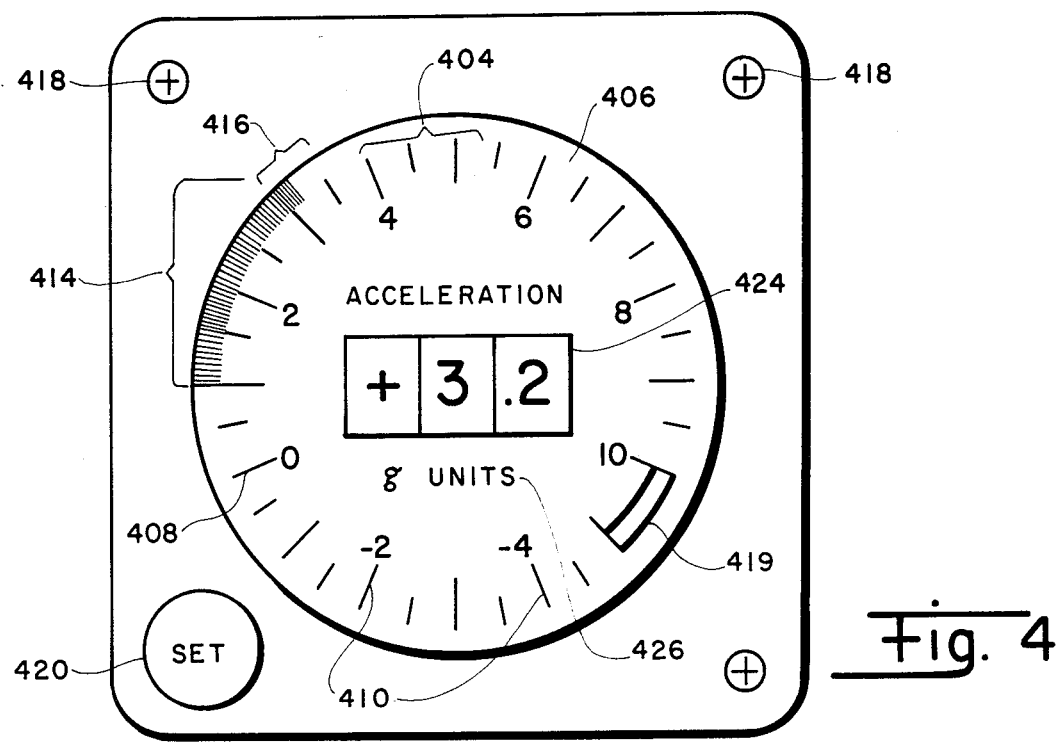
FIG. 4 is an alternate display arrangement for an accelerometer instrument which employs a single numeric readout field instead of two fields.

The numerical readout using the digital readout field 124 provides increased acceleration display accuracy and may be, for example, especially useful in stable flight conditions or during the incurrence of small G-force values. As shown in FIG. 1, FIG. 2 and FIG. 4, the digital readout fields provide the capability of reading G-force acceleration units between 0.1 G and 99.9 G; values above 10.9 G are, however, of limited usefulness in view of human endurance and airframe design limits for G-force accelerations. The different ranges for the positive and negative G force graphic displays, the number sequences 107 and 110 in FIG. 1, are similarly inspired since airframe and human tolerance of negative G forces is limited.

The general nature of the data indicated by the FIG. 1 instrument is denoted by the display-identifying legend 126; this legend is permanently affixed to the display face 106 by engraving, printing or other known arrangements.

Provision is also made in the FIG. 1 apparatus for numeric data identifying legends in the fields 122 and 130. The field 122 may, for example, be used to indicate the positive nature of the G force value in the field 124 and the field 122 to indicate the negative nature of the G force value in the field 128. These legends in the fields 122 and 130 when used in this manner are also correct for indicating the memory stored maximum positive incurred G force value and maximum incurred negative G force value in response to actuation of the knob 120 as described below. Preferably only one of the digital readout fields 124 and 128 is activated during normal use of the FIG. 1 instrument wherein information is being conveyed to the vehicle operator; the choice of activated field is then determined by whether the presently incurred G force acceleration is positive or negative in nature. When the stored values of G force acceleration such as maximum positive or maximum negative values incurred since reset are displayed, both of the fields 124 and 128 are preferably activated together. For instruments responsive to left or right direction G forces, the information displayed in the field 122 might, for example, indicate G forces along the positive or negative Y axis. Alternately, of course, the alphanumeric readout fields 122 and 130 could be omitted from the instrument.

The graphic indication of acceleration G forces represented by the active or visible state transducer elements 114 is shown in FIG. 1 to originate with the value of 1.0 G, the G force resulting from the attraction of the earth; other display arrangements including a starting of the graphic indication at the zero value 108 are, of course, possible. In similar fashion, other variations of the FIG. 1 display are possible, such as, for example, having the value of $\phi G$ located at the bottom of the display face 106 or locating the annular display area 112 in a smaller, more interior portion of the face 106.

The maximum incurred values of positive and negative G force indicated in the fields 124 and 128 are useful for airframe maintenance and future design purposes in the case of an aircraft mounted acceleration G-force indicator. Election between the positive and negative memory stored G-force values for display by the FIG. 1 apparatus is preferably accomplished with manipulation of an interrogation control which may be incorporated into the functions performed by the control or setting knob 120. The FIG. 1 instrument may also be arranged for memory stored data access by the use of an electrical interrogating signal from an external test set or by some other interrogation arrangement, as may be desired.

As shown in FIG. 1, the value displayed in the digital readout field 128 includes a positive sign; the use of a left-most position in the digital readout field for sign communication is, of course, possible in both of the digital readout fields 124 and 128 if desired. Such sign indication in the fields 124 and 128 may therefore supplement the indication in the fields 122 and 130. In related fashion, the number of digit positions in the readout fields 124 and 128 may be adjusted to suit the instrument application under consideration; a larger number of digit positions or an increased number of positions to the right of the decimal point or similar variations are, of course, a matter of choice in embodying the invention. The range and resolution of the graphic display, that is, the range and resolution of the members 107 and 110 in FIG. 1, is also a matter of embodiment choice, with the physical size of each transducer element 116 and the numerical significance assigned to each transducer element being selectable display parameters.

Figure 6:
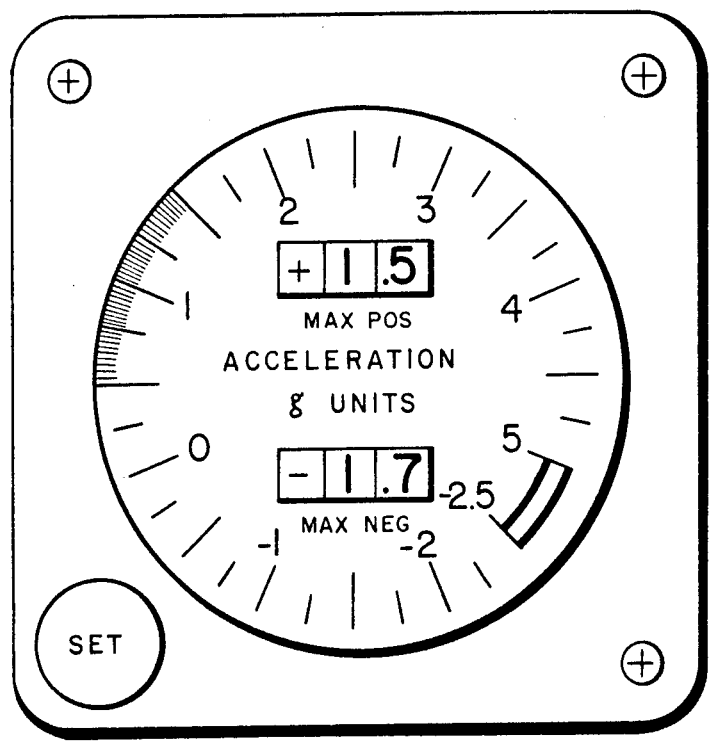
FIG. 6 shows an alternate arrangement of the FIG. 1 display.

According to another aspect of the invention, for example, the same internal circuitry may be employed for realizing an instrument having a range of −2.5 to +5.0 g units as for an instrument having a range of −5.0 to +10.0 g units with the election between these ranges achieved through the use of different connector wiring for the instrument according to the desired range. Different display faces 106 are also of course required for these two different range capabilities of the instrument, and may be accommodated by providing a library of standard display faces of different range and sensitivity, an additional one of which is shown in FIG. 6 of the drawings.

Another display arrangement using a simple larger numeric readout instead of two readouts is also possible, and may be preferable in some applications because of the need for a larger numeric readout; such a display is shown in FIG. 4 of the drawings. During normal use, the single larger numerical readout of FIG. 4 would alternate between negative and positive g readings with a − and a + sign before the number displayed. The number displayed would, of course, correspond to the g value as displayed on the moving analog column.

The set knob 120 in the FIG. 1 instrument may also be used to adjust the starting reference point of the G-force scale for the small variations in G force occurring at differing locations over the earth, for initializing the display, and for accommodating drift or circuit variations that may occur in the instrument. The several functions attributed to the set knob 120 herein may be segregated according to different knob movements such as rotation, pushing, pulling, and end-of-travel switches. For example, the knob 120 may be arranged to accomplish memory clearing in response to a pulling action, and to cause the display of maximum positive and negative acceleration values (in the readout fields 124 and 128) in response to a pushing action, or alternately may be arranged to display maximum positive and negative acceleration values in response to clockwise rotation and accomplish maximum positive and negative G force memory clearing in response to counterclockwise rotation. Other knob movements or combinations of movement and achieved function could, of course, be employed.

Alternate arrangements of FIG. 1 acceleration G-force measuring instrument face are shown in FIG. 2 and FIG. 4 of the drawings. The major difference between the FIG. 2 arrangement and the arrangement shown in FIG. 1 is, of course, the linear disposal of the graphic display area 212 in comparison with the annular disposal in FIG. 1. The accompanying linear arrangement of the numbers 204 in FIG. 2 in comparison with the circular member scale 104 in FIG. 1 also distinguishes the FIG. 1 and FIG. 2 arrangements. The numeric value displays 224 and 228 and the fields 222 and 230 are also relocated in the FIG. 2 face arrangement. The FIG. 4 display arrangement is similar to the FIG. 1 arrangement except for use of a single larger numeric display.

The identifying numbers for similar parts in the FIG. 1, FIG. 2 and FIG. 4 drawings are the same except for the first digit or hundreds digit, of the number, which is in the 100 series in FIG. 1, in the 200 series in FIG. 2 and in the 400 series in FIG. 4. The names applied to the various elements in the FIG. 2 and FIG. 4 arrangements of the instrument face are the same as for the FIG. 1 arrangement, again using this 100, 200 and 400 number series figure segregation.

The FIG. 2 face arrangement offers the advantage of placing the bar graph area 212 in a linear and vertically-oriented direction, as is conventional for bar graph displays and therefore may be better comprehended by some craft operators under conditions of stress or rapid observation than is the FIG. 1 circular bar graph arrangement.

The FIG. 1, FIG. 2 and FIG. 4 instruments may be arranged to have, for example, 1⅞ inch display faces 106, 206 and 406 which is surrounded by a 2.375 inch square flange or bezel 100 and mounted in a standard 2-inch instrument panel opening. When the G force instrument is used in an aircraft, the mounting fasteners 118, 218 and 418 are preferably located at standard aircraft position locations for such instruments.

The illumination for the FIG. 1, FIG. 2 and FIG. 4 display faces, especially in the case of liquid crystal transducers wherein no light is generated by the transducer but the transmission of externally-sourced light is modulated for display purposes—can be from a standard incandescent filament lamp using a wedge-shaped light diffusing arrangement, as is known in the instrument art. The incandescent lamp for such illumination may be of the standardized five-volt alternating current or direct current excited variety as is used in modern military aircraft, in accordance with the MIL-L-25467 or MIL-L-27160 military specifications.

Figure 3:
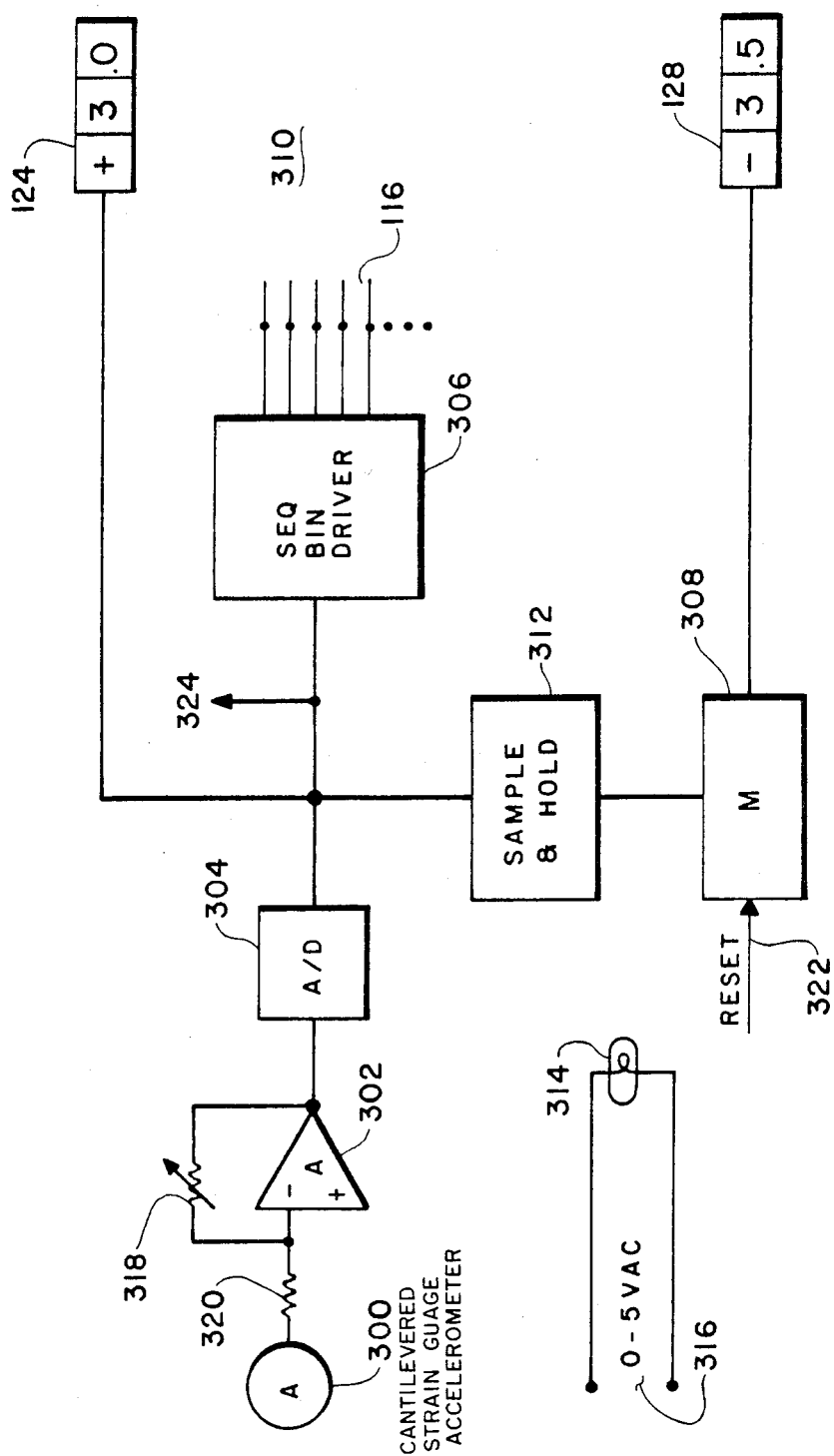
FIG. 3 is a block diagram for electronic apparatus usable in operating the FIG. 1, FIG. 2 and FIG. 4 displays.

In aircraft uses of the FIG. 1, FIG. 2 or FIG. 4 instrument, it is also common to desire a standard G force measuring instrument for use in a variety of different aircraft, each aircraft having a different instrument panel arrangement, differing airframe G capability and a different tilt back from vertical for the instrument panel. The tilt of the mounting instrument panel also determines the mounting orientation of the instrument body portion which is located behind the display faces in FIG. 1, FIG. 2 and FIG. 4. Variations in this tilt also vary the orientation of the incorporated G-force sensing transducer with respect to the actuating gravity force vector. These variations may be accommodated by introducing a gain correction in the electronic circuitry which actuates the FIG. 1, FIG. 2 and FIG. 4 displays. For a Z-axis instrument, the true G force to be indicated by the FIG. 1, FIG. 2 and FIG. 4 displays is of course, proportional to the cosine of the angle between the axis of the sensing transducer and the G-force vector directed to the center of the earth. Variations of this cosine value with angle variations may be accommodated by a cosine function gain control which may be further arranged to be automatically adjusted by connector pin jumper circuits in the wiring connecting the instrument to the aircraft. According to such an arrangement which is shown in representative fashion in FIG. 5 of the drawings, the same instrument realizes different and individually tailored gain settings when installed in different aircraft types—without the need for individual instrument adjustments for each type of aircraft. In the FIG. 5 instrument arrangement, for example, the adjustable resistor 318 in FIG. 3 is embodied in the form of three different valued resistors 515, 517 and 519, one of which is selected for use in each particular vehicle or aircraft type by the jumper wire 525 or a similar jumper wire located electrically in the positions 527 or 529 of FIG. 5. Physically, of course, the jumper wire 525 is located in the instrument cable connector of each different aircraft to receive the acceleration indicating instrument.

Figure 5:
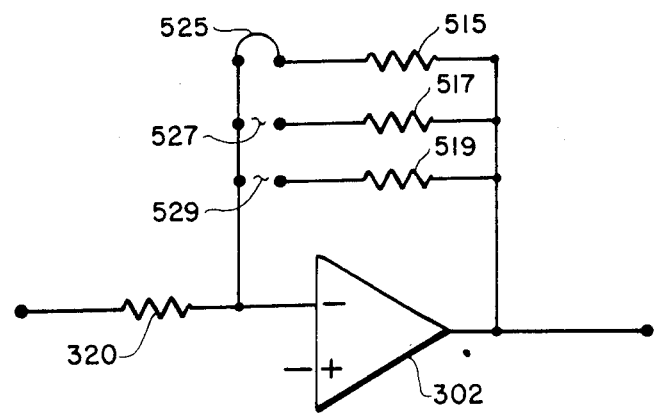
FIG. 5 shows some of the FIG. 3 apparatus in an alternate arrangement thereof.

One possible arrangement for this instrument panel tilt compensation is capable of accommodating panel tilts between 0 and 19 degrees, using a series of five instrument gain ranges; these ranges are, according to this arrangement, divided at 3.5, 7.5, 11.5 and 15.5 degrees of tilt, with the different ranges of tilt compensation being elected in a variation of the FIG. 5 arrangement by shorting different pairs of gain determining resistors and connecting pins in the instrument connector for each type of aircraft the instrument is mounted in.

An electronic circuit capable of controlling the electrical-to-optical transducer elements 116, 216 and 416 is shown in block diagram form in FIG. 3 of the drawings. The FIG. 3 diagram includes a G-force to electrical signal transducer or accelerometer 300 which is coupled to a signal amplifier 302 of the operational amplifier type. The output signal of the amplifier 302 drives an analog-to-digital converter 304. The digital or binary signals from the converter 304 are supplied to a sequential binary driver circuit 306 which in turn actuates the plurality of transducer elements 116 in the optical display 310. The transducer elements 116 are the same type of elements as shown at 116 in FIG. 1, at 216 in FIG. 2 and at 416 in FIG. 4. Signals from the analog-to-digital converter 304 are also applied to a sample and hold circuit 312 and to a memory circuit 308 which may be of the random access memory or RAM type. The output of the memory circuit 308 is connected to the digital readout field 128 which is shown in FIG. 3 in addition to the previously discussed showing in FIG. 1. In similar fashion, the output of the analog-to-digital converter 304 is also coupled directly to the digital readout field 124 which is shown in both FIG. 3 and FIG. 1 of the drawings.

During operation of the FIG. 3 circuitry, signal representing G-force acceleration is supplied by the transducer or accelerometer 300, this signal is generated preferably through the use of electrical resistors which are responsive to the straining of a cantilever member or some other limited movement member used to support a sensing mass. The transducer 300 may also be of the piezoelectric type or of the magnetic field and pickup coil type. A number of different arrangements for the transducer 300 were described and incorporated herein by reference in connection with the patents mentioned above.

The small size and light weight of presently available accelerometer transducers, and their operation through the use of limited mechanical motion together with an ability to be readily enclosed within a small confined space such as the cavity of an integrated circuit chip, makes the physical location of the accelerometer 300 within an instrument of the type described in FIG. 1, FIG. 2 and FIG. 4 feasible. The transducer is usually arranged to respond to up and down or Z axis forces as described above, however, transducers responsive to left and right G forces, forward and backward G forces, or combinations of these forces—with a single instrument display or plural displays, are within the scope of the invention. A left and right G force sensing transducer, for example, could be achieved merely by mounting an accelerometer at ninety degrees from the Z axis orientation.

The output signal from the accelerometer 300 is supplied to the A/D converter 304 by way of an amplifier 302 which is represented in FIG. 3 as an operational amplifier. The illustrated amplifier incorporates a resistor gain determining network including the resistors 320 and 318. As is known in the operational amplifier art, the relative values of the resistors 318 and 320 determine the signal gain in the amplifier 302, it being intended in the present example that at least one of these resistors, for instance the resistor 318, is made variable as is described above in connection with FIG. 5 of the drawings in response to use of a particular pattern of connecting pins and jumper wires in the accelerometer connecting cable, or alternately or in addition, through the use of adjustment controls which can be included in the FIG. 1, FIG. 2 and FIG. 4 instrument. The amplifier 302 may, of course, comprise a portion of the analog-to-digital converter 304 or may be a separate circuit as shown. The output of the analog-to-digital converter 304 is presumed to be a digital value suitable for the readout field 124, except for the possible need for a register or other small memory circuit for assembly and periodic refreshing of the displayed data.

Digital values appearing at the output of the analog-to-digital converter are sampled and the largest occurring positive and negative acceleration values stored and continually updated in the memory 308 for display on the readout field 128. Resetting of the memory 308 is accomplished by way of a reset signal indicated at 322 in FIG. 3, this signal being derived by some arrangement of the set knobs 120, 220 and 420 in FIGS. 1, 2 and 4. The memory 308 in FIG. 3 is contemplated to be of the non-volatile storage type in order that the instrument may retain previously attained values of positive and negative G forces during instrument powered-down intervals.

The sequential binary driver 306 in FIG. 3 is of the circuit type which activates an increasing number of display elements 116 as the input signal received from the analog-to-digital converter increases in size upward or downward from a zero value. Discrete amplitude thresholds for signals received from the analog-to-ditial converter are established in the binary driver circuit 306, that is, each of the elements 116 is arranged, for example, to represent one-tenth of a G unit of input signal magnitude.

The FIG. 3 circuitry may also include a signal tap indicated at 324 in order that the displayed acceleration signals may also be recorded or transmitted to a remote location such as to a slave indicator, for example. The tap 324 may be located at almost any of the signal conducting paths between blocks in FIG. 3, but is conveniently arranged to transmit the output of the analog-to-digital converter 304 as shown. The incandescent lamp and alternating current source therefor which illuminate the display faces 106, 206 and 406 in FIGS. 1, 2 and 4 are shown at 314 and 316 in FIG. 3.

The single digital readout field 424 in FIG. 4 permits the digital readout portion of the display face to be larger and more easily read from a distance or under stressful conditions and also enables a possible cost reduction over the two readout FIG. 1 embodiment of the instrument. The signal digital readout also avoids the appearance of a blank readout field on the face of the instrument during use—a condition which would occur in the FIG. 1 embodiment for all use conditions except when the accelerometer is being interrogated for maximum attained G values. Interrogation of the FIG. 4 accelerometer can be achieved by actuation of the control knob 420 in such a manner as to display maximum positive and maximum negative G loadings in sequence rather than at the same time, as was described for the FIG. 1 arrangement. A plus or minus sign as shown in FIG. 4 can be used to indicate the direction of the G forces displayed in FIG. 4.

The described acceleration measuring instrument is therefore capable of providing accurate, easily-comprehended indications of G force incurred by a vehicle during vehicle maneuvering and vehicle movement in a turbulent fluid environment such as rough air. In addition, the instrument is capable of providing long operating life and freedom from mechanical failures along with the advantages of small size, light weight (1.5 lbs or less) and low operating power (7 watts or less). The described instrument is capable of mounting in a variety of aircraft or vehicle types and in a variety of instrument panel tilt configurations without the need for individual adjustments. Dual numeric and graphic display of the sensed acceleration G forces provided by the instrument are desirable for both accuracy and for quick readability under difficult conditions.

While the apparatus and method herein described constitute a preferred embodiment of the invention, it is to be understood that the invention is not limited to this precise form of apparatus or method, and that changes may be made therein without departing from the scope of the invention, which is defined in the appended claims.

We claim:

1. Flight instrument apparatus for use by an aircraft pilot comprising the combination of:
   an acceleration G force to electrical signal transducer element;
   a pilot viewable length organized analog graphic display capable of aircraft instrument panel mounting and including a plurality of electrical-to-optical transducer element graph segments located in a predetermined lengthwise expansible geometric arrangement in the face thereof;
   said G force transducer element and said analog graphic display being each responsive to G-force signals in the positive and negative force directions;
   electrical circuit means for exciting said display transducer element segments in lengthwise cumulative magnitude responsive incremental order in response to said acceleration G force electrical signal;
   said G force to electrical signal transducer element, said display and said electrical circuit means being mounted within a single instrument housing and including adjustable gain control means capable of compensating off-axis mounting of said instrument in an aircraft instrument panel;
   said gain control means including a plurality of gain determining resistance elements and means connected with said resistance elements for selecting different of said resistance elements in response to said instrument being mounted in different aircraft.

2. The instrument apparatus of claim 1 further including a numeric display capable of conveying digital acceleration G force information corresponding to information conveyed by said analog graphic display to said pilot.

3. The apparatus of claim 2 wherein said numeric display is arranged to indicate numeric values in correspondence with said display transducer element segments.

4. The apparatus of claim 3 further including electronic memory means for remembering the largest attained value of said acceleration G force electrical signal and means for selectively communicating said remembered signal to said numeric display.

5. The apparatus of claim 1 wherein said G-force transducer element is responsive to forces along the Z axis of an aircraft, the Z axis being in the direction of up and down with respect to aircraft flight.

6. The apparatus of claim 1 wherein said G force to electrical signal transducer includes electrical resistance elements having electrical resistance proportional to the sensed G force acceleration.

7. The apparatus of claim 1 wherein said different resistance elements are correlated with the different instrument panel slopes of said different aircraft.

8. The apparatus of claim 1 wherein said different resistance elements are correlated with different ranges of G force sustainable by said different aircraft.

9. The apparatus of claim 8 further comprising display face library means including a plurality of different standardized display face configurations each having a different range of maximum G force value for configuring said instrument for use in different types of aircraft.

10. The apparatus of claim 9 wherein said standardized display face configurations include commonly configured index marks.

11. The apparatus of claim 1 wherein said single instrument housing is configured to mount in a standard aircraft instrument panel opening.

12. The apparatus of claim 1 wherein said electrical-to-optical transducer elements in said analog graphic display are liquid crystal cells.

13. The apparatus of claim 12 wherein said liquid crystal cells are circumferentially disposed around the periphery of said pilot viewable display face.

14. The apparatus of claim 12 wherein said liquid crystal cells are disposed along a linear path in said display face.

15. The apparatus of claim 1 wherein said electrical-to-optical transducer elements in said graphic display are light emitting diode elements.

16. An electronic G-force sensing and indicating instrument comprising:
   transducer means for generating an analog electrical signal responsive to the magntiude of a sensed G-force acceleration;
   electronic circuit means for converting said analog electrical signal to a plurality of coded binary signals representing successive increments of G-force amplitude value at successive code values, each increment of increased G force changing an additional one of said coded binary signals from an inactive to an active condition;
   electrically-controlled display means for converting said coded binary signals to visual stimuli, said display means including a plurality of binary signal actuated display elements located in an ordered physical array, each connected with one of said plurality of coded binary signals, and visually responsive to said active condition thereof and also including digital display means having a plurality of digital number readout fields each of multiple digit positions for indicating numerically the attained value of said binary signals;
   maximum range selecting means including connector means keyed individually to a plurality of different aircraft types for electrically selecting the appropriate range and sensitivity of said instrument in each said aircraft type according to a predetermined plan for tailoring the range and sensitivity of said instrument to different predetermined values in response to instrument mounting in different airframes; and
   a display face configured in correspondence with said appropriate range and sensitivity of said instrument for each said aircraft type.

17. An electronic acceleration G force sensing and indicating instrument for universal deployment in a plurality of different aircraft types comprising the combination of:

an electrical signal generating acceleration G force sensing transducer element responsive to the acceleration force acting along a predetermined axis of an aircraft, said transducer element being a limited movement mass supported by a deformable element;

an electrically energized visual stimulus display disposable within the view of a pilot of said aircraft, said display including both an array of adjacently disposed visual transducer elements display field and a multiple digit numeric display field;

electronic circuit means connected with said G force sensing transducer element and said visual stimulus display for energizng said adjacently disposed visual transducer elements display field and said multiple digit numeric display field, said electronic circuit means also including non-volatile electronic memory means for remembering the largest values of acceleration incurred by said aircraft in both directions along said predetermined axis since the occurrence of a memory resetting event;

means for selectively indicating said bidirectional largest acceleration values in said multiple digit numeric display field; and means disposable within said instrument for selectively configuring said instrument to the characteristics of a plurality of different host aircraft.

18. The apparatus of claim 17 further including gain adjustment means connected with said electronic circuit means for adjusting the sensitivity of said instrument in response to the deployed aircraft type, said gain adjustment means comprising said means for selectively configuring.

19. The apparatus of claim 18 wherein said means for selectively configuring further includes a display face selected from a differing acceleration range family of display faces correspond to different host aircraft.

20. The apparatus of claim 17 wherein said predetermined axis is the up and down axis with respect to said aircraft.

21. The apparatus of claim 17 wherein said acceleration G force sensing transducer element includes electrical resistance variable strain gauge cells.

22. The apparatus of claim 17 wherein said deformable element comprises a cantilever element.

23. The apparatus of claim 17 wherein said adjacently disposed visual transducer elements comprise an annular shape pattern located around the perimeter of a display face portion of said instrument.

24. The apparatus of claim 23 wherein individual transducer elements in said annular pattern visual transducer elements are radially disposed with respect to said display face.

25. The apparatus of claim 17 wherein said adjacently disposed visual transducer elements comprise a straight line pattern located in a display face portion of said instrument.

26. The apparatus of claim 17 wherein said multiple digit numeric display field also comprises a separate display field for acceleration forces in each direction along said axis.

27. The apparatus of claim 17 further including manually operable reset control means for performing said memory resetting event.

* * * * *

UNITED STATES PATENT AND TRADEMARK OFFICE
CERTIFICATE OF CORRECTION

PATENT NO. : 4,622,548

DATED : November 11, 1986

INVENTOR(S) : James R. Andres et al

It is certified that error appears in the above-identified patent and that said Letters Patent is hereby corrected as shown below:

At column 3, line 67, correct the spelling of "provide".

At column 7, line 34, insert "the" following "of".

At column 13, line 14 (claim 17), correct the spelling of "energizing".

Signed and Sealed this

Seventh Day of April, 1987

Attest:

DONALD J. QUIGG

Attesting Officer

Commissioner of Patents and Trademarks